United States Patent [19]

Knapp

[11] 4,365,884
[45] Dec. 28, 1982

[54] STILL CAMERA WITH RETRACTING OBJECTIVE

[75] Inventor: Helmut Knapp, Biebertal, Fed. Rep. of Germany

[73] Assignee: MINOX GmbH, Giessen, Fed. Rep. of Germany

[21] Appl. No.: 265,779

[22] Filed: May 21, 1981

[30] Foreign Application Priority Data

May 29, 1980 [DE] Fed. Rep. of Germany ....... 3020340

[51] Int. Cl.³ .......................................... G03B 17/04
[52] U.S. Cl. .................................................. 354/187
[58] Field of Search ............................... 354/187–195, 354/288

[56] References Cited

U.S. PATENT DOCUMENTS 4,264,172  4/1981  Miyagawa et al. ................ 354/187
4,277,157  7/1981  Miyagawa et al. ................ 354/187

FOREIGN PATENT DOCUMENTS 55-117136  9/1980  Japan ................................ 354/187

Primary Examiner—John Gonzales
Attorney, Agent, or Firm—Wells & Wells

[57] ABSTRACT

A still camera with a fold up cover, a retracting objective and a drive connection between these components acting within the light tight camera space on the objective mount so that the objective is advanced when the cover is opened and retracted when the cover is shut.

The camera has the following features:
(a) the drive connection is divided into outer drive links (4–5, 6, 7) and inner drive links (10, 11);
(b) the outer drive links (4–5, 6, 7) are connected with the cover (3) so as to positively control the cover;
(c) the inner drive links (10, 11) are connected with the objective mount (2) so as to positively control the mount; and
(d) the connection between the outer and inner drive links consists of a round shaft (8) supported in a bore (9) of the housing (1) with a light tight snug fit.

7 Claims, 3 Drawing Figures

STILL CAMERA WITH RETRACTING OBJECTIVE

CROSS REFERENCE TO RELATED APPLICATION

Applicant claims priority under 35 USC 119 for application P 30 20 340.8, filed May 29, 1980 in the Patent Office of the Federal Republic of Germany.

BACKGROUND OF THE INVENTION

The present invention relates to a still camera having a flip open cover and a retractable objective connected with the cover so that the objective is pulled out as the cover is folded open and is retracted when the cover is folded shut.

In the prior art still cameras of this kind, the light tightness is a special problem. This problem is solved for simple cameras by inserting a bellows between the objective seat and the camera housing, where this bellows can be folded together.

However, this kind of design is unsuited for small cameras with solid housings and where because of compactness the objective in the retracted position is fully sunk into the housing and thereby comes to rest directly on the film plane. The latter characteristic makes it impossible to implement a direct operational connection between the cover and a mount remaining outside for the retracted state, which otherwise would ensure light tightness. Only such an operational connection is possible, which on the one hand acts on the objective mount in the light tight camera space and on the other hand acts on the cover outside this light tight space. This necessitates a passageway through the housing wall in order to arrive from the outside cover to the inside mount by means of one or several drive links in order that, if possible at all, the objective be moved from its inside limit position into its picture taking position by one opening motion of the cover. This passageway must be light tight itself.

SUMMARY OF THE INVENTION

Having in mind the limitations of the prior art, it is an object of the present invention to provide such a passageway which shall be simple in design and construction and therefore easily manufactured and nevertheless absolutely light tight.

This object is achieved by the present invention for a camera having the following features:
- (a) the operational connection between the flip cover and the objective mount is divided into outer and inner drive means;
- (b) the outer drive means are connected to the cover so that they will be positively controlled by it;
- (c) the inner drive means are connected with the objective mount so that it will positively control them; and
- (d) the connection between the outer and inner drive means consists of a round shaft supported in a housing bore with a light tight fitted seat.

The passageway from the outer space into the light tight camera inner space therefore consists in accordance with the present invention solely of a round bore within which rotates a round shaft. This bore can be easily made commercially, and the bore and the shaft can easily be implemented with such respective fits that no light shall reliably enter the camera inner space. For increased safety the shaft moreover may be provided with an offset, a collar or the like which together with a matchingly shaped bore offset would form a labyrinth.

In a particular embodiment of the concept leading to the solution, the outer drive means are a four link device of which the fixed link is formed by the camera housing and of which the coupler is so connected to the swinging member by an elongated slot in this swinging member that the drive means, due to spring support when the cover is flipped shut, arrives at a top dead position where the cover is firmly resting against the housing by spring action.

The inner drive means consist of a plain swing lever comprising an elongated slot at its free end to act on a pin fixed into the objective mount. If the lever is pivoted, the objective is moved to and fro by this pin/elongated slot connection.

The present invention provides a further embodiment in the form of a locking system for the objective when in its front picture taking position, where the system cooperates with the swing lever. The system consists of a locking lever pivotably supported in the rear, light tight camera inside space and snapping into position under spring pressure by means of a locking surface behind the pin fixed to the objective mount.

The locking lever itself comprises a fixed pin cooperating by means of a bevel with the free end of the swing lever. Due to this cooperation, first the locking lever is lifted out of its locking position at the beginning of the fold in motion of the cover, before the retraction motion of the objective begins. To that end the elongated slot in the swing lever is somewhat widened at this location so that the swing lever at the beginning of motion moves through an idle path with respect to the objective mount, during which course it is lifted out of the locking position. Only the pin will thereafter be at the objective mount and hence the entire objective is carried along in the retraction motion.

BRIEF DESCRIPTION OF THE DRAWINGS

The appended drawings illustrate the present invention in relation to one embodiment, wherein.

DESCRIPTION OF THE PREFERRED EMBODIMENTS

Figure 1:
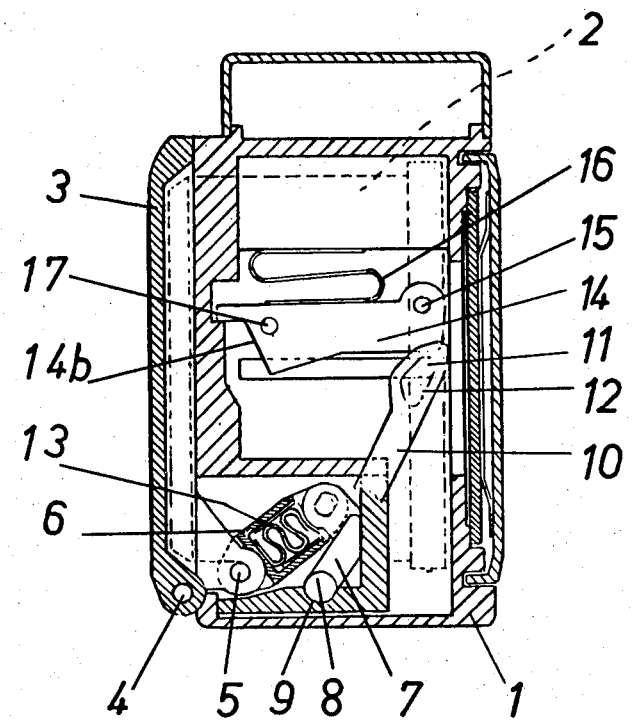
FIG. 1 is a schematic section through a still camera with the retracting objective system of the present invention.

With particular reference to FIG. 1, the camera housing is designated by 1 and holds at its front side an objective in a mount 2 which is displaceably supported. A light sealing element, for instance a felt strip, a rubber ring or the like is inserted in known manner between the front side and the objective mount, so that it is feasible to move the objective through the front side without light penetrating the camera inside space.

A cover 3 covers the objective at the camera front side and this cover pivots around a shaft 4 fixed to the housing.

A lever 6 is pivotably connected to the cover at point 5 and is connected at its other end in rotational manner to a lever 7. This lever 7 is fixed to a point in the camera housing but is capable of rotation by means of a shaft.

The lever arms between the shaft 4 and the point 5 at the cover 3, the lever 6 and the lever 7 are the outer drive links of a drive linkage mounted between the cover 3 and the objective mount 2 and effecting the advance of the objective when the cover is folded open and the retraction of the objective when the cover is folded shut, as described further below.

In terms of linkages, these outer drive links form a four link structure, where the spacing between the shaft 4 and the point 5 represents the crank, the lever 6 the coupler and the lever 7 the swing means.

The motion of the lever 7 is transmitted by the shaft 8 to the inside drive links of the side drive linkage. This shaft 8 projects through a bore 9 (FIG. 3) into the light tight camera inner space. The bore thus represents the transition from the light permeable outer space into the light tight inner space. As the bore and the shaft are round, they are easy to make commercially and for a sufficiently tight snug fit between shift and bore they provide a wholly light tight passageway.

The inside drive links consist of a swing lever 10 solidly connected at one end to the shaft 8, and of a pin 11 which is fixed to the objective mount. The swing lever 10 at its free end is provided with an elongated slot 12 surrounding the pin 11.

Due to the solid connection between the swing lever 10 and the shaft 8, the swing lever is moved along with every shaft rotation and pivoted. If, therefore the cover 3 is folded open or shut, the outer drive links perforce are displaced and hence the swing lever 10 also is pivoted to and fro between two end positions. Therefore, the objective through its mount 2 also is advanced or retracted by means of the elongated slot 12 and the pin 11.

Figure 3:
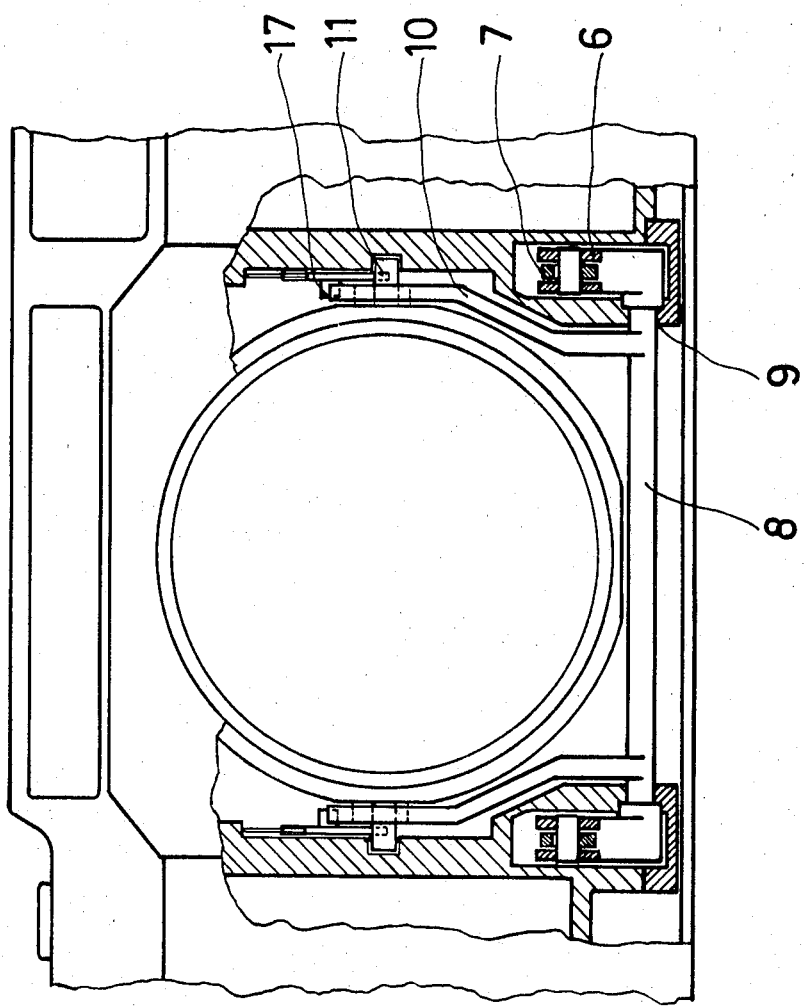
FIG. 3 is a front view of the camera shown partly in section.

As shown by FIG. 3, the outer and inner drive links are present in duplicate, on each side of the objective mount 2 in a symmetrical arrangement to this mount. Therefore, the displacing force acts symmetrically on the objective mount and tilting of the objective during the displacement is prevented on account of the shaft 8 which is common to the swing levers 10 mounted on both sides of the objective.

In order that the cover 3 when in its folded shut position shall also always rest securely against the camera housing, the rotational connection between the levers 6 and 7 is designed in a special manner. To that end the lever 7 is provided with a small elongated slot within which the lever 6 can easily slide to and fro by means of a pin. Moreover, a compression spring 13 is mounted between the levers 6 and 7. The arrangement is such that for the shut position of the cover 3, the lever 6 arrives at a sort of top dead point position into which it is pressed by spring 13. Accordingly, the cover 3 always rests under some stress against the housing 1 when in the closed position.

Figure 2:
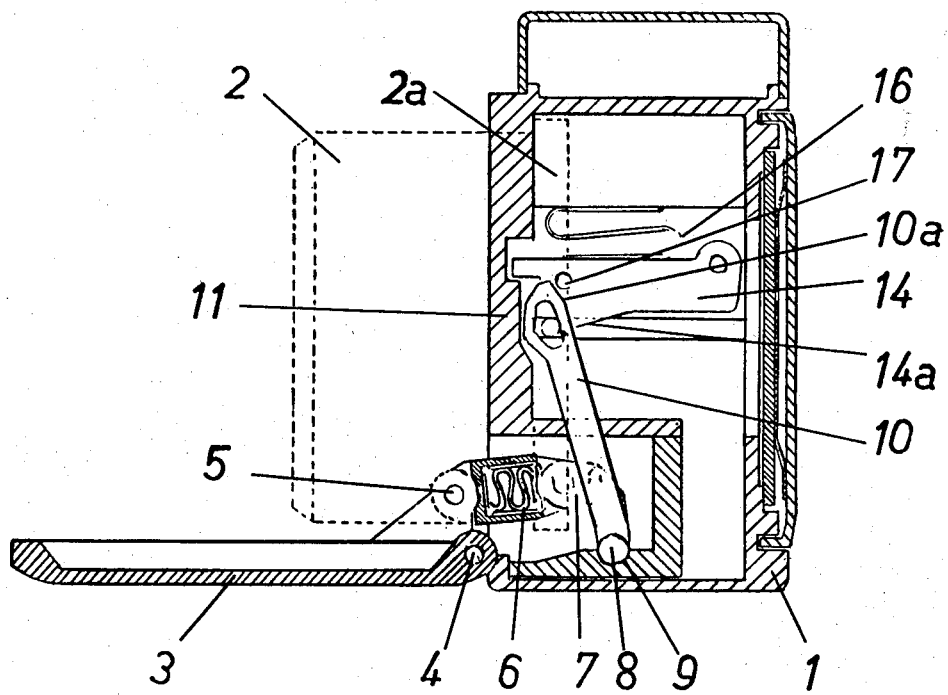
FIG. 2 is a schematic section through a camera as in FIG. 1 but with the extended objective.

In the picture taking position of the objective, the mount 2 rests by means of a collar 2a against the inside of the front housing wall (FIG. 2). This stop position is precisely defined. It is adjusted to the back lens/image distance of the objective. The objective also must be locked in this position so it cannot be accidentally displaced during picture taking. A locking lever 14 is provided for that purpose which is pivotably supported at 15 in the rear area of the light tight camera inside space and is stressed by a compression spring 16. When now the objective is advanced by means of the swing lever 10, then the pin 11 fixed to the mount slides underneath a slanted surface 14a of the lever 14 which thereby is raised against the force of the spring 16. When the forward objective position is reached, the lever 14 with its slanted surface 14b falls behind the pin 11 of the objective and locks it into the picture taking position.

When it is desired to fold shut the cover 3 and hence to retract the objective, then first the locking lever 14 must be lifted out of its locked position. This takes place at the beginning of the pivoting motion of the lever 10 by means of a slanted surface 10a fashioned at the lever 10 and cooperating with a pin 17 which is firmly seated on the locking lever 14. At the beginning of the fold shut motion of the cover 3, this slanted surface—still before the objective mount 2 starts moving—impacts the pin 17 and raises the lever 14 and only then does the retraction of the mount 2 begin.

To make this possible, the elongated slot 12 is kept somewhat wide in this area. The swing lever 10 therefore at the beginning of the retraction first passes through a short idle path relative to the pin 11. During this idle course the locking lever 14 is lifted against the force of the spring 16, so that thereafter the objective together with its mount 2 is retracted.

I claim:

1. In a still camera having a housing, a fold up cover, a retracting objective and a drive connection between these components acting within the light tight camera space on an objective mount so that the objective is advanced when the cover is opened and retracted when the cover is shut, the improvement comprising the following features in combination:
   (a) said drive connection divided into outer drive links (4–5, 6, 7) and inner drive links (10, 11);
   (b) said outer drive links (4–5, 6, 7) connected with said cover (3) so as to positively control said cover;
   (c) said inner drive links (10, 11) connected with said objective mount (2) so as to positively control said mount; and
   (d) a connection between the outer and inner drive links consisting of a round shaft (8) supported in a bore (9) of said housing (1) with a light tight snug fit.

2. The still camera of claim 1, wherein said round shaft (8) is provided with at least a first offset and said bore (9) comprises identically shaped second offsets which together with said first offset define a light tight labyrinth.

3. The still camera of claim 1, wherein outer drive links consist of a four link mechanism comprising a crank (levers 4-5) supported on a pivot shaft (4) of said cover (3) and a swing member (lever 7) supported by said round shaft (8) extending into the camera inside.

4. The still camera of claim 3, wherein a lever (6) is connected in rotational manner to said swing member (7) and to said crank (4-5) and a compression spring is mounted between said lever (6) and said swing member (7) which for said cover (3) folded shut effects a tilting of said lever (6) in an elongated slot in said swing lever into a top dead center position and thereby insures a firm rest of said cover (3) against said housing.

5. The still camera of claim 1, wherein said inner drive links consist of a swing lever (10) solidly connected to said round shaft (8) for the purpose of common rotation and of a pin (11) fixed to said objective mount (2) and subjected to the action of said swing lever (10) by means of an elongated slot (12) therein.

6. The still camera of claim 2, provided with a spring-loaded locking lever (14) in the light tight camera inside space to act on said objective mount (2) when it is in the picture taking position, said locking lever being pivotably supported in a rear camera space and being provided at its front end with a slanted locking surface (14b) that engages behind a first pin (11) fixed to said objective mount when in the locked state and with a second pin (17) cooperating with a swing lever (10).

7. The still camera of claim 6, wherein said swing lever (10) is provided with a slanted surface (10a) against which rests said second pin (17) fixed to said locking lever when said objective is in the advanced position, where the slope of said slanted surface is such that at the beginning of the cover folding shut motion said locking lever (14) is first raised out of its locking position by said slanted surface (10a) and said second pin (17).

* * * * *